United States Patent
Murphy et al.

(10) Patent No.: US 10,336,174 B1
(45) Date of Patent: Jul. 2, 2019

(54) SYSTEMS AND METHODS FOR MAGNETIC ENGINE MOUNT

(71) Applicant: Honda Motor Co., Ltd., Tokyo (JP)

(72) Inventors: Nathaniel S. Murphy, Hilliard, OH (US); Kyle A. LeBlanc, Marysville, OH (US); Shanaka Ranatunga, Hilliard, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/152,331

(22) Filed: Oct. 4, 2018

(51) Int. Cl.
| | | |
|---|---|---|
| *F16M 11/00* | (2006.01) | |
| *B60K 5/12* | (2006.01) | |
| *H01F 7/02* | (2006.01) | |
| *F16F 6/00* | (2006.01) | |
| *B60K 5/04* | (2006.01) | |

(52) U.S. Cl.
CPC .............. *B60K 5/125* (2013.01); *F16F 6/005* (2013.01); *H01F 7/02* (2013.01); *B60K 5/04* (2013.01); *F16F 2222/06* (2013.01)

(58) Field of Classification Search
None
See application file for complete search history.

(56) References Cited

U.S. PATENT DOCUMENTS

| | | | |
|---|---|---|---|
| 4,725,046 A | 2/1988 | Sugino | |
| 6,305,675 B1 | 10/2001 | Muramatsu | |
| 9,423,000 B2 | 8/2016 | Tan et al. | |
| 9,556,927 B2 | 1/2017 | Smith | |
| 9,874,264 B2 | 1/2018 | Gaither | |
| 2003/0205857 A1* | 11/2003 | Fujita | F16F 6/005 267/140.14 |
| 2015/0204406 A1 | 7/2015 | Yoon | |
| 2016/0327116 A1 | 11/2016 | Kim | |
| 2017/0328441 A1* | 11/2017 | Kanaya | B60K 5/1208 |

FOREIGN PATENT DOCUMENTS

| | | |
|---|---|---|
| CN | 104948656 A | 9/2015 |
| CN | 106799958 A | 6/2017 |
| FR | 2986842 A1 | 8/2013 |
| WO | 0049309 A2 | 8/2000 |
| WO | 2015099308 A1 | 7/2015 |
| WO | 2016084558 A1 | 6/2016 |
| WO | 2017199801 A1 | 11/2017 |

* cited by examiner

*Primary Examiner* — Amy J. Sterling
(74) *Attorney, Agent, or Firm* — Kenealy Vaidya LLP

(57) ABSTRACT

A mount system for mounting a first component of a vehicle to a second component of the vehicle can include a tube portion and a shaft portion. The tube portion can include a first outer magnet support portion provided with an inwardly facing magnet that is parallel to a centerline; and a second outer magnet support portion provided with an inwardly facing magnet set that includes magnets oblique to the centerline. The shaft portion can include a first inner magnet support portion, oriented about the centerline, provided with an outwardly facing magnet that is parallel to the centerline; and a second inner magnet support portion provided with an outwardly facing magnet set that includes magnets oblique to the centerline.

20 Claims, 11 Drawing Sheets

SYSTEMS AND METHODS FOR MAGNETIC ENGINE MOUNT

BACKGROUND

Current typical technology for engine mount construction is to use rubber connections to hold powertrain position and to limit vibration transfer from a powertrain component to the frame or body of the vehicle. In some known cases, hydraulic fluid can be used to generate damping forces. In particular, hydraulic fluid, forced through orifices, can be utilized to generate damping characteristics.

However, known systems are lacking in various ways including the degree to which known systems isolate vibration transfer from the powertrain of the vehicle to the frame of the vehicle.

SUMMARY

Some embodiments of this disclosure are directed to a mount system for mounting a first component of a vehicle to a second component of the vehicle. The mount system can include a tube portion and a shaft portion. The tube portion, including a first component mount, can be provided about a centerline. The tube portion can include a first outer magnet support portion, oriented about the centerline, provided with an inwardly facing magnet that is parallel to the centerline; and a second outer magnet support portion, provided about the centerline, provided with an inwardly facing magnet set that can include a first inwardly facing damper magnet that is oblique to the centerline, and a second inwardly facing damper magnet that is oblique to the centerline. The shaft portion, can include a second component mount, and can be provided about the centerline. The shaft portion can include a first inner magnet support portion oriented about the centerline, and the first inner magnet support portion can include an outwardly facing magnet that is parallel to the centerline; and a second inner magnet support portion oriented about the centerline, and the second inner magnet support portion can include an outwardly facing magnet set that can include: a first outwardly facing damper magnet that is oblique to the centerline, and a second outwardly facing damper magnet that is oblique to the centerline. The inwardly facing magnet can interact with the outwardly facing magnet to repel, with a first air gap provided therebetween. The first inwardly facing damper magnet can interact with the first outwardly facing damper magnet to attract, with a second air gap provided therebetween. The second inwardly facing DM can interact with the second outwardly facing damper magnet to repel, with a third air gap provided therebetween.

Some embodiments are directed to a vehicle with mount system. The vehicle can include a powertrain component; a vehicle frame; and a mount system. The mount system can connect the powertrain component to the frame at respective locations on the powertrain component. The mount system can include a tube portion and a shaft portion. The tube portion, can include a first component mount, and can be provided about a centerline. The tube portion can include a first outer magnet support portion oriented about the centerline, and the first inner magnet support portion can include an inwardly facing magnet that is parallel to the centerline; and a second outer magnet support portion oriented about the centerline, and the second outer magnet can include an inwardly facing magnet set that can include a first inwardly facing damper magnet that is oblique to the centerline, and a second inwardly facing damper magnet that is oblique to the centerline. The shaft portion, can include a second component mount, and can be provided about the centerline. The shaft portion can include a first inner magnet support portion oriented about the centerline, and the first inner magnet support portion can include an outwardly facing magnet that is parallel to the centerline; and a second inner magnet support portion oriented about the centerline, and the second inner magnet support portion can include an outwardly facing magnet set that can include: a first outwardly facing damper magnet that is oblique to the centerline, and a second outwardly facing damper magnet that is oblique to the centerline. The inwardly facing magnet can interact with the outwardly facing magnet to repel, with a first air gap provided therebetween. The first inwardly facing damper magnet can interact with the first outwardly facing damper magnet to attract, with a second air gap provided therebetween. The second inwardly facing damper magnet can interact with the second outwardly facing damper magnet to repel, with a third air gap provided therebetween.

Some embodiments are directed to a mount system for mounting a first component of a vehicle to a second component of the vehicle. The mount system can include a tube portion and a shaft portion. The tube portion, can include a first component mount, and can be provided about a centerline. The tube portion can include a first outer magnet support portion oriented about the centerline, and the first outer magnet support portion can include an inwardly facing magnet that is parallel to the centerline; and a second outer magnet support portion oriented about the centerline, and the second outer magnet support portion can include an inwardly facing magnet set that includes: a first inwardly facing damper magnet that is oblique to the centerline, and a second inwardly facing damper magnet that is oblique to the centerline. The shaft portion can include a second component mount, and can be provided about the centerline. The shaft portion can include a first inner magnet support portion oriented about the centerline, and the first inner magnet support portion can include an outwardly facing magnet that is parallel to the centerline; and a second inner magnet support portion oriented about the centerline, and the second inner magnet support portion can include an outwardly facing magnet set that can include: a first outwardly facing damper magnet that is oblique to the centerline, and a second outwardly facing damper magnet that is oblique to the centerline. The inwardly facing magnet can interact with the outwardly facing magnet to repel, with a first air gap provided therebetween. The first inwardly facing damper magnet can interact with the first outwardly facing damper magnet to attract, with a second air gap provided therebetween. The second inwardly facing damper magnet can interact with the second outwardly facing damper magnet to repel, with a third air gap provided therebetween. The tube portion can include an overstroke assembly. The overstroke assembly can include: a first energy absorbing member mounted on the tube portion; and second energy absorbing member mounted on the shaft portion such that the first and second energy absorbing members are spaced apart from each other when each of the first air gap, the second air gap, and the third air gap are maintained, and the first and second energy absorbing members contact each other when one of the tube portion and the shaft portion moves relative to another one of the tube portion and the shaft portion by a distance less than any one of the first gap, the second gap, and the third gap.

Further embodiments and features are described below.

BRIEF DESCRIPTION OF THE DRAWINGS

The disclosed subject matter of the present application will now be described in more detail with reference to exemplary embodiments of the system, apparatus and method, given by way of example, and with reference to the accompanying drawings, in which.

DETAILED DESCRIPTION OF EXEMPLARY EMBODIMENTS

A few inventive aspects of disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Known technology is subject to various problems and disadvantages. In known technology, to maintain good control of powertrain position, a high stiffness rubber is typically used as an engine mount. In known technology, such arrangement can be needed so as to provide dynamic clearance to surrounding parts, as well as for desired handling and feeling. However, in order to achieve good noise, vibration, and harshness (NVH) performance, for example, low stiffness rubber must be used for powertrain mounts, including the mount for the engine. As a result, in known technology, requirements are in direct conflict with each other.

The systems and methods of the disclosure address the above problems as well as other problems in known technology.

The systems and methods of the disclosure utilize permanent magnets to maintain powertrain position, including various components that make up the powertrain. In at least some embodiments, an air gap is maintained between rigid parts that are connected to the powertrain of the vehicle and rigid parts that are connected to the frame of the vehicle. Thus, the portion of the mount that is connected to the powertrain can be mechanically isolated from the portion of the mount connected to the frame of the vehicle. For example, a component of the powertrain that can be connected to the frame, using the systems and methods of the disclosure, is the engine. As a result, the arrangement of the disclosure can substantially isolate the frame, and therefore vehicle occupants, from vibrations introduced by the engine.

Figure 1:
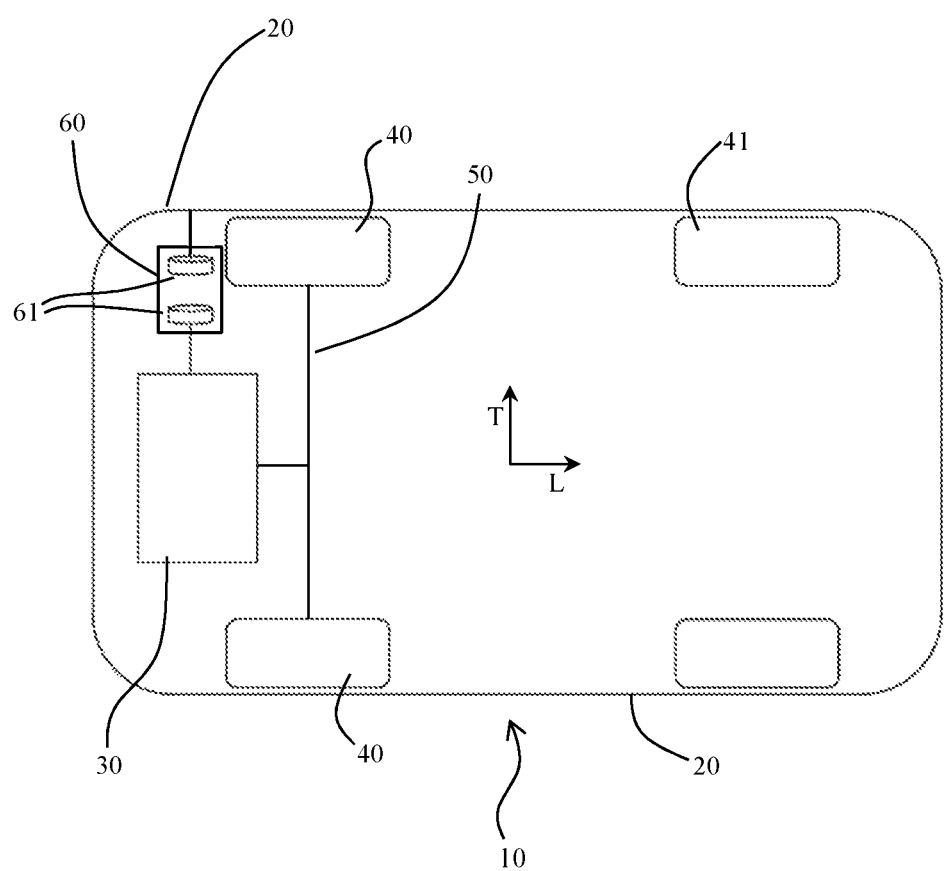
FIG. 1 is a schematic view of a powertrain in a vehicle provided with a magnetic engine mount (MEM) system, in accordance with one or more embodiments of the disclosure.

The system of the disclosure can be characterized as a magnetic engine mount (MEM) device or MEM system. FIG. 1 is a schematic view of a powertrain of a vehicle 10 that includes an exemplary MEM device or system 60 (hereinafter "MEM system 60") that can support a power source 30 with a magnetic field such that the power source 30 is mechanically decoupled from a vehicle frame or body 20. For example, the MEM system 60 can include a magnet set 61 where a first magnet of the magnet set 61 is mechanically connected to the vehicle frame or body 20 and a second magnet of the magnet set 61 is connected to the power source 30 such that the magnetic field of the first magnet repels the magnetic field of the second magnet. In a neutral state where no input force is applied to the MEM system 60 by the power source 30, the magnets can be spaced apart from each other by a predetermined distance.

When the MEM system 60 receives a input load from the power source 30, magnets of the magnet set 61 can be forced toward each other to reduce the distance there between. As result of such relative movement, the magnets of the magnet set 61 receive a repulsive force. As the stroke increases, the repulsive force also increases. That is, as the repulsed magnets draw closer to each other, a greater force is generated to repel such magnets away from each other. Accordingly, such arrangement effectively provides a highly responsive force to dampen and otherwise control forces.

On the other hand, as the input load on the MEM system 60 lessens, the repulsive force between the magnets of the magnet set 61 displaces the magnets of magnet set 61 back to their original relative positions prior to the input from the power source 60 in which the magnets are spaced apart by the predetermined distance.

In accordance with at least one embodiment of the disclosure, during normal operation, one or more air gaps are can be effectively maintained between the magnets of the magnet set 61 such that the powertrain is mechanically decoupled from the frame or body 20 of the vehicle 10. As a result, the MEM system 60 can provide substantially enhanced vibration isolation between the powertrain 30 and the frame or body 20 of the vehicle 10. In particular, powertrain generated vibration can be substantially isolated from the frame or body 20 of the vehicle 10, and as a result, isolated from the occupants of the vehicle 10.

The MEM system 60 of the disclosure can provide various advantages. An engine mount system equipped with the MEM system 60 can theoretically have near zero vibration transmitted from the powertrain to the frame. As a result, the arrangement can provide for large downstream simplification of structural components of the vehicle 10, which (in the absence of the system of the disclosure), are often made stiffer or more robust to improve powertrain vibration isolation. Accordingly, the vehicle structure can be made lighter and less expensive than conventional structures.

Referring to FIG. 1, the vehicle 10 includes a set of drive wheels 40 and a set of free-wheeling wheels 41. The drive wheels 40 are connected to a power source 30 via a drivetrain 50. It is appreciated that various mechanisms can be utilized to control the transmission of power between the power source 30 and the drive train 50, such as a multi-ratio gear transmission, for example.

The power source 30 can be an internal combustion engine, an electric motor or a hybrid of an internal combustion engine and an electric motor. The power source configured as an internal combustion engine or a hybrid power source can have the engine output axis oriented in the longitudinal direction L or in the traverse direction T of the vehicle. The engine can be mounted forward of the front axles, rearward of the rear axles, or intermediate the front and rear axles. In the exemplary embodiment of FIG. 1, the power source is configured as a transversely-oriented front-mounted internal combustion engine.

FIG. 1 also shows, schematically represented, MEM system 60, in accordance with one or more embodiments. However, a particular vehicle can well have multiple MEM systems so as to connect the power source or other powertrain component to the frame of the vehicle (or to another component of the vehicle). Accordingly, while FIG. 1 schematically shows a single MEM system 60, the disclosure is of course not limited to such single MEM system.

As shown in FIG. 1, the MEM system 60 serves to connect the power source 30 to the vehicle frame or body 20. The MEM system 60 is shown schematically to include magnet set 61. Such magnet set 61 represents one or more magnet sets that can be present in a particular MEM system 60, i.e. at a particular attachment point of the powertrain component to the frame, for example. In accordance with at least one embodiment of the disclosure, each MEM system 60 can include three sets of magnets as otherwise described herein.

Figure 2:
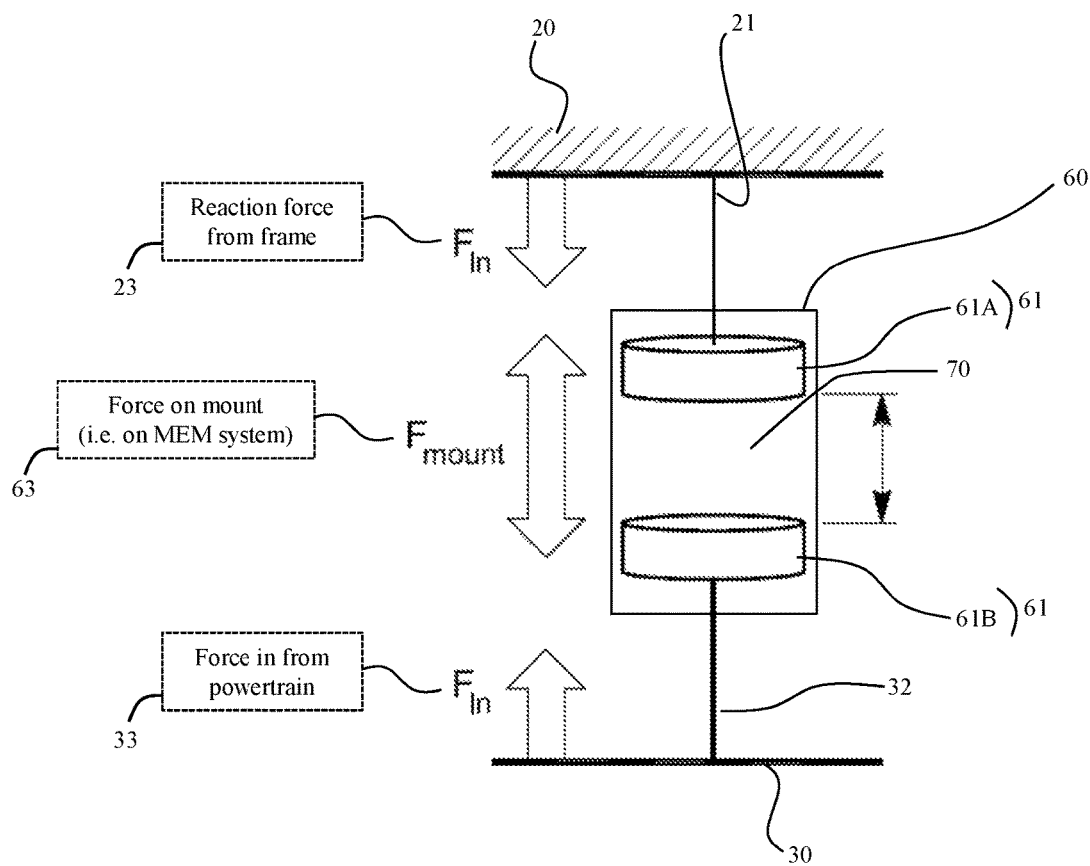
FIG. 2 is a schematic view of a MEM system along with a frame and power source of a vehicle, in accordance with one or more embodiments of the disclosure.

FIG. 2 is a schematic view of a MEM system 60 along with a frame or body 20 and power source 30 of the vehicle 10, in accordance with one or more embodiments of the disclosure. As shown, the MEM system 60 is connected to the vehicle frame or body 20 via a suitable frame mount 21. Also, the MEM system 60 is connected to the powertrain component 30 via a suitable powertrain mount 32.

Referring to FIGS. 1 and 2, the MEM system 60 includes a magnet set 61. Specifically, the magnet set 61 includes magnet 61A and magnet 61B. as described above, such magnets are representative of one or more magnets, and typically three sets of magnets, in accordance with one or more embodiments. As shown in FIG. 2, magnet 61A and magnet 61B are separated by an air gap 70. In the situation that the magnet set 61 is constituted by magnets that repel each other, then as the air gap grows smaller the repelling force will grow stronger. In the situation that the magnets set is constituted by magnets that attract each other, then as the air gap grows smaller the attraction force will grow greater. Further aspects are described below with reference to FIG. 3.

As illustrated in FIG. 2, the MEM system 60 experiences both a force 33 in from the powertrain on the one side of the MEM system, as well as a reaction force 23 from the frame on the other side of the MEM system. As a result, a force 63 is experienced by the mount, i.e. on the MEM system 60. In operation, the mount (MEM system 60) needs to reconcile these two incoming forces 23 and 33. The MEM system 60 of the disclosure performs this reconciliation of forces using magnets spaced apart by an air gap, as described herein.

Figure 3:
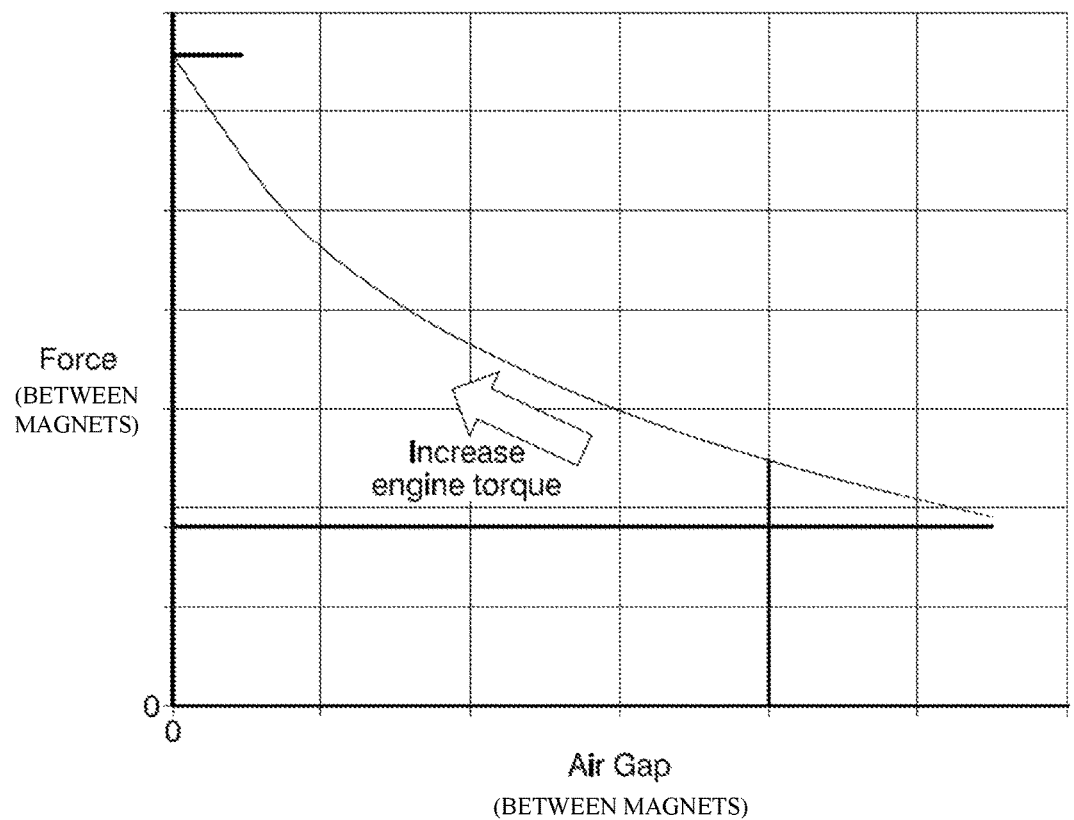
FIG. 3 is a diagram showing a relationship between force and air gap, in the context of magnetic force and increase in engine torque, in accordance with one or more embodiments of the disclosure.

FIG. 3 is a diagram showing a relationship between force and air gap, in the context of magnetic force and increase in engine torque, in accordance with one or more embodiments. In operation of a powertrain, various forces are generated by the powertrain. Illustratively, a powertrain component can be constituted by a fuel powered engine. In operation of such an engine, as load from the engine increases force vectors generated by the engine can fluctuate substantially. In operation, as illustrated in FIG. 2, it is necessary to reconcile these force vectors with force vectors reacted by the frame of the car. In the MEM system of the disclosure, this reconciliation is performed utilizing one or more sets of magnets.

With further reference to FIG. 3, the MEM system 60 provides an arrangement that can responsively and proportionally respond to the various force vectors generated by a powertrain component. As shown by the graph of FIG. 3, as an air gap between magnets grows smaller or narrows, the force experienced between those 2 (or more) magnets increases. This creates a beneficial situation in which as more force is needed, due to more relative movement between the powertrain component and the frame, more force is generated.

Figure 4:
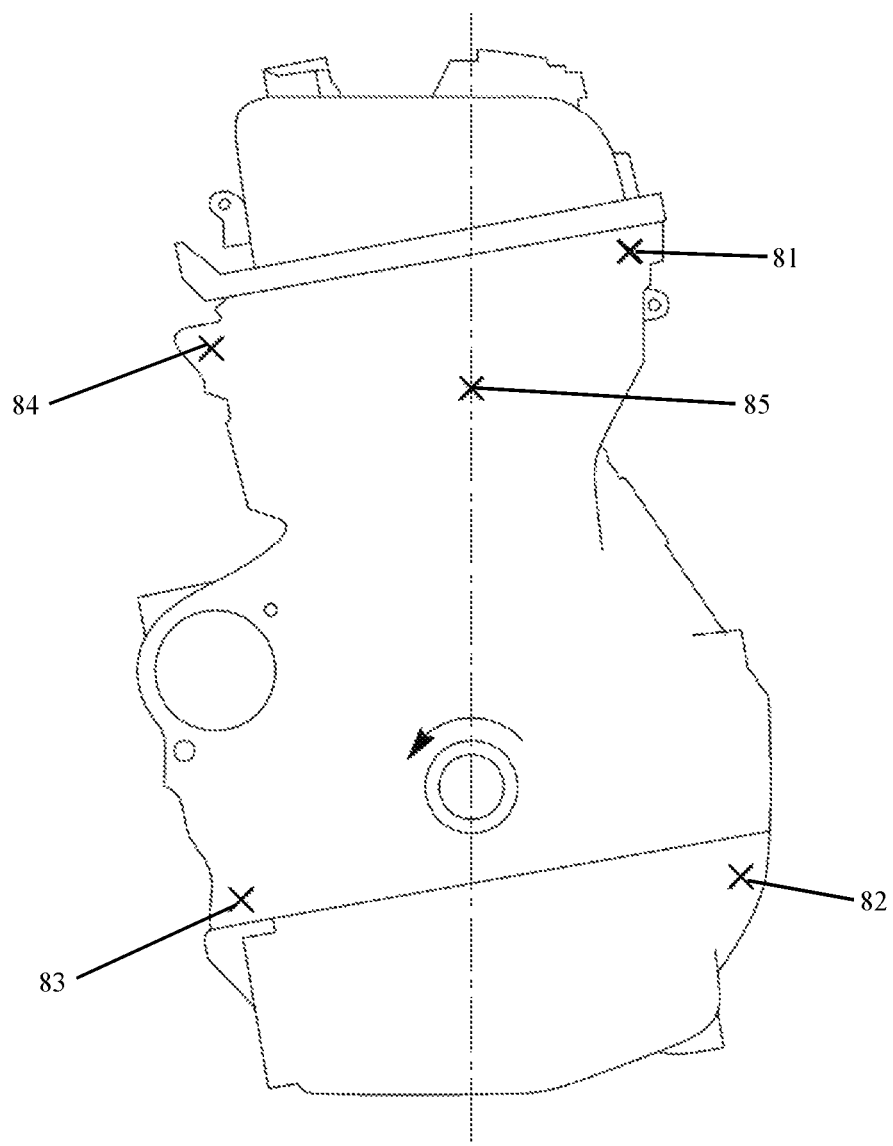
FIG. 4 is an end view of an engine in conjunction with a plurality of different mounting locations for the MEM system, in accordance with one or more embodiments of the disclosure.

As described above, it is appreciated that a plurality of MEM systems can be utilized to connect or attach a powertrain component to the frame (or other supporting structure) of the vehicle. Relatedly, FIG. 4 shows a plurality of different mounting locations 81, 82, 83, 84, 85 on the power source or engine 30 to which the MEM system 60 can be connected, in accordance with one or more embodiments. For example, the attachment mounts 31 might be integrally cast into the engine block or the attachment mounts might be bolted on to the engine block or other component of the power source, for example. As shown, the connection arrangement can include an upper right mounting location 81, a lower right mounting location 82, a lower left mounting location 83, an upper left mounting location 84, and a fifth mounting location 85 along the centerline or middle of the power source 30, as shown in FIG. 4. However, it is of course appreciated that the particular connection points and/or connection arrangements can vary widely depending on the particular power source component, the forces that the power source component is expected to generate, the size of the power source, the power/torque expected to be output by the power source, as well as a variety of other factors.

Hereinafter, further features and characteristics of the system of the disclosure, in accordance with one or more embodiments, will be described with reference to FIGS. 5-8.

Figure 5:
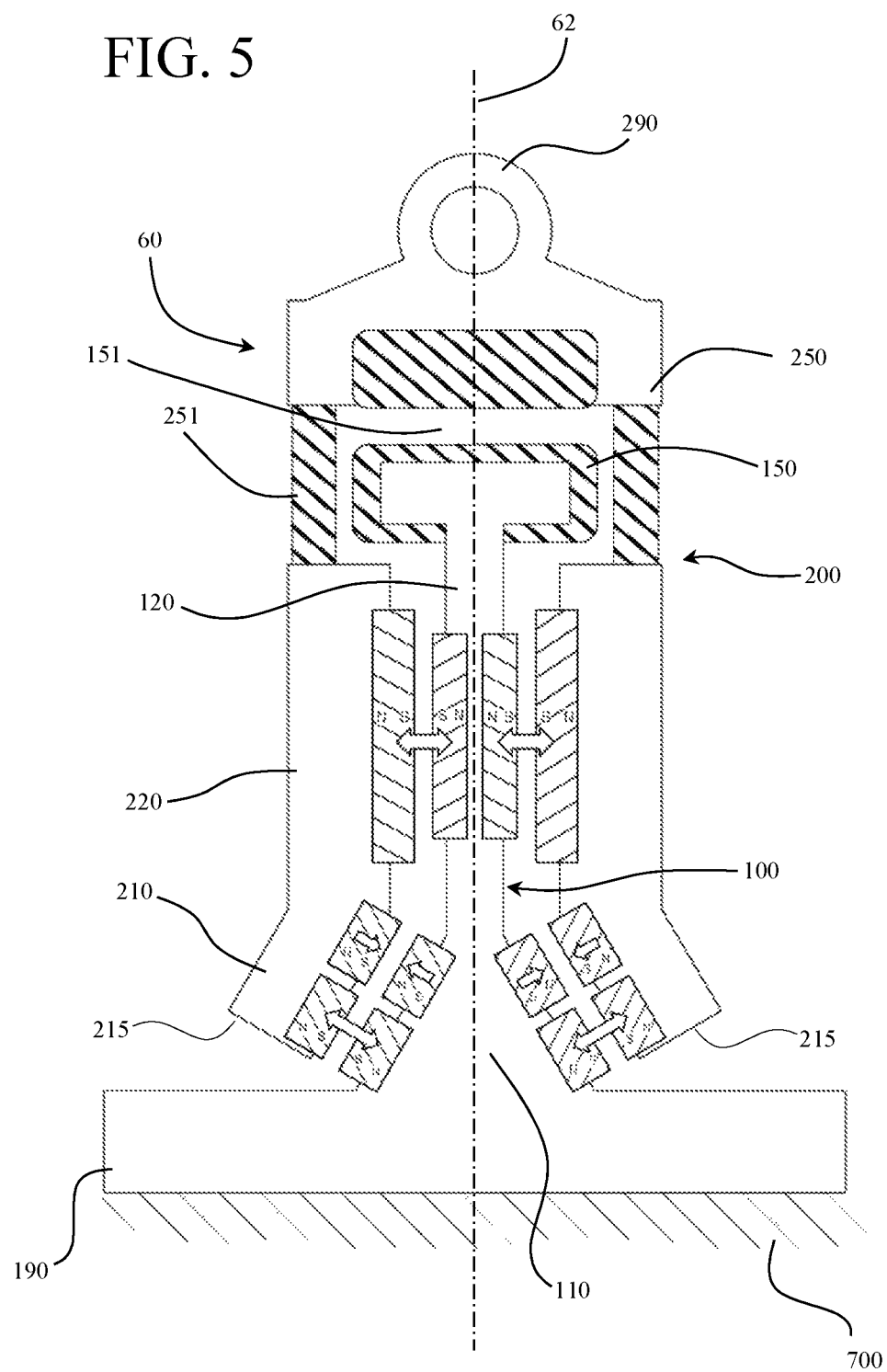
FIG. 5 is a cross-sectional schematic view showing a magnetic engine mount (MEM) system, in accordance with one or more embodiments of the disclosure.
Figure 6:
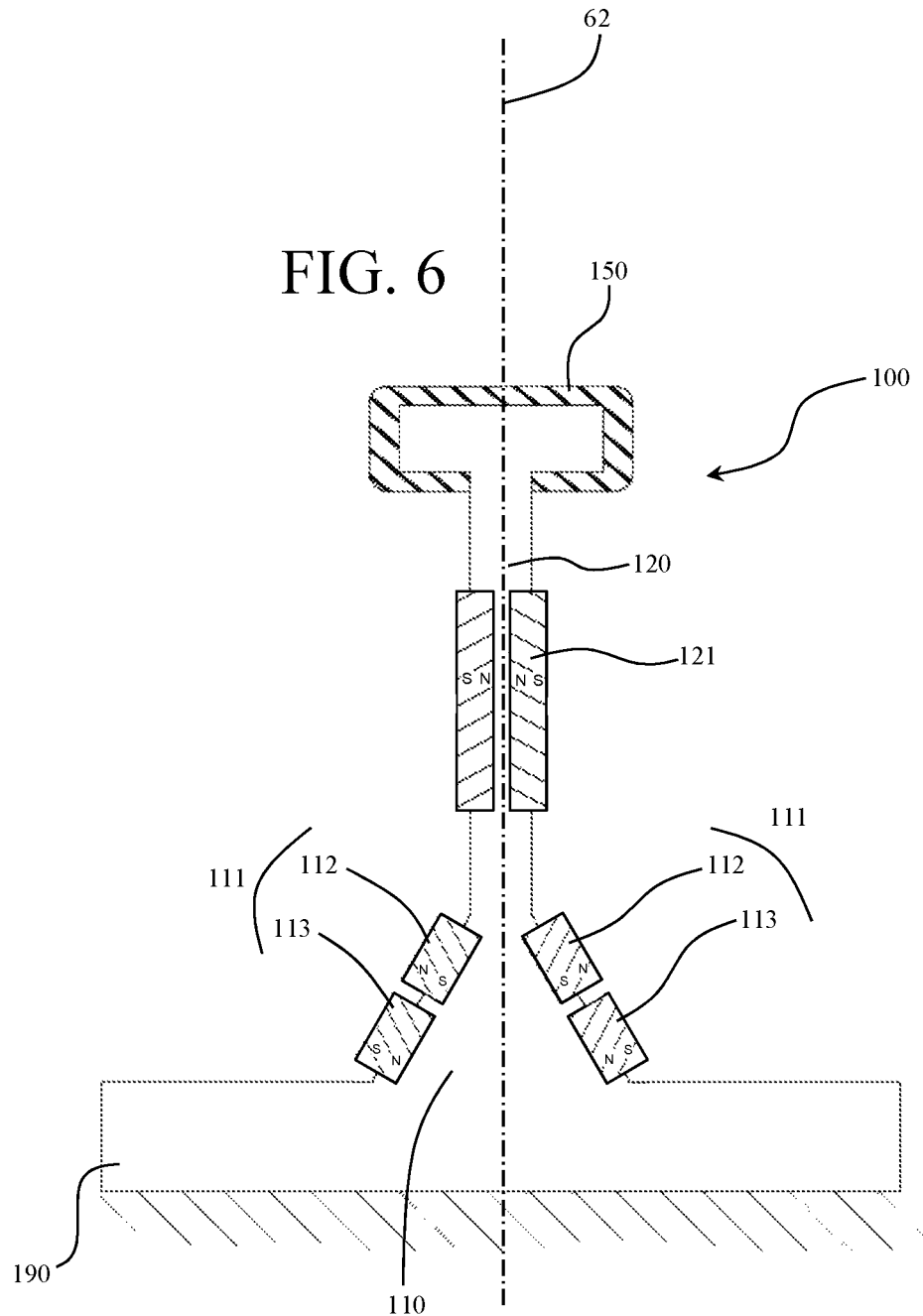
FIG. 6 is a cross-sectional schematic view showing shaft portion of FIG. 5, in accordance with one or more embodiments of the disclosure.
Figure 7:
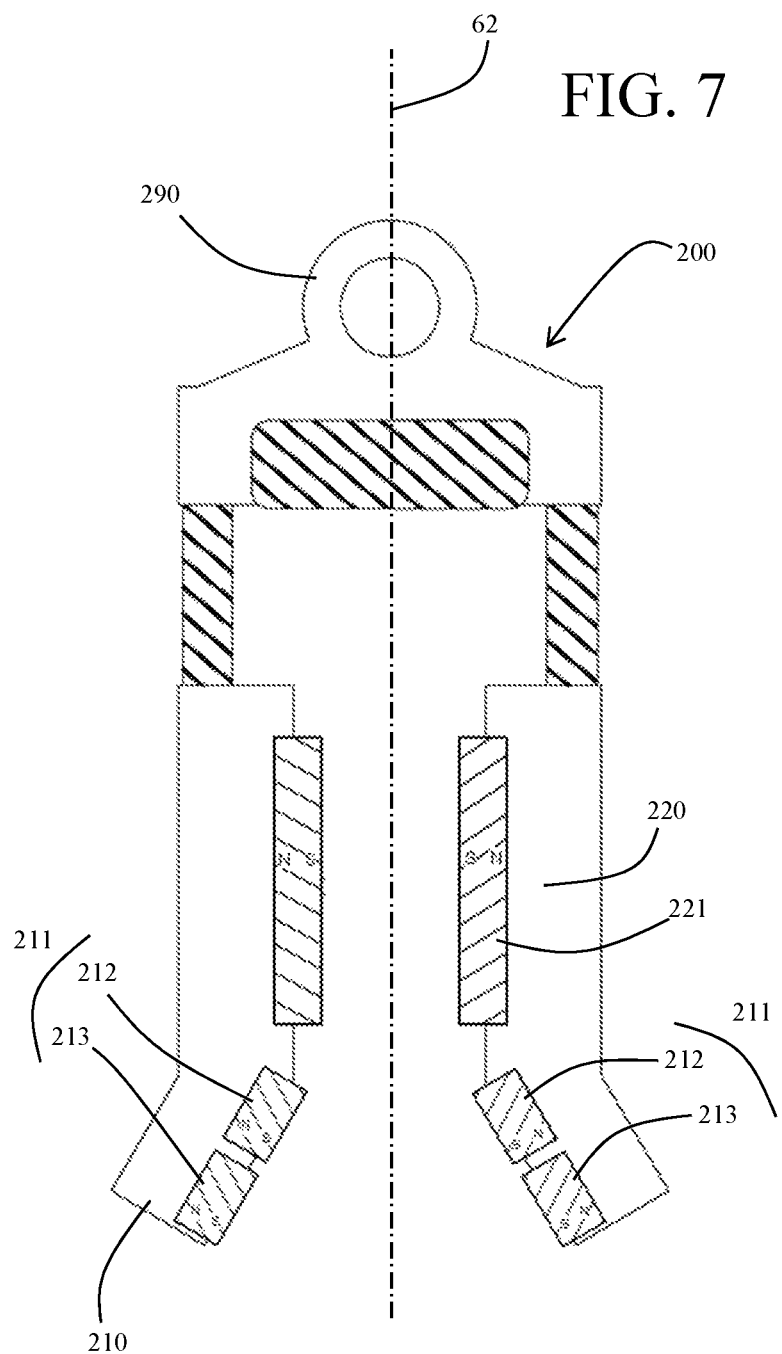
FIG. 7 is a cross-sectional schematic view showing tube portion of FIG. 5, in accordance with one or more embodiments of the disclosure.
Figure 8:
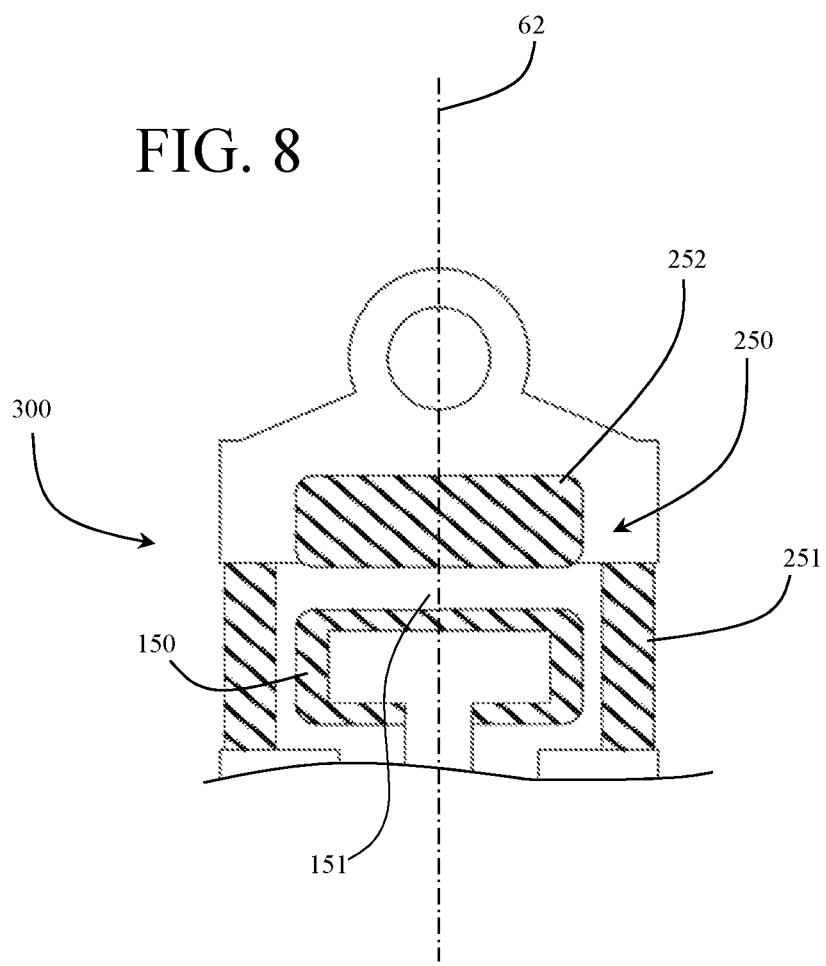
FIG. 8 is a cross-sectional schematic view showing the overstroke assembly, of the tube portion, of FIG. 5, in accordance with one or more embodiments of the disclosure.

More specifically, FIG. 5 is a cross-sectional schematic view showing a magnetic engine mount (MEM) system 60, in accordance with one or more embodiments of the disclosure. As described below, related FIGS. 6-8 illustrate particular components or portions of the MEM system 60, as shown in FIG. 5.

As shown in FIG. 5, the MEM system 60 includes a tube portion 200 and a shaft portion 100. As shown, at least a portion of the shaft portion 100 is disposed within at least a portion of the tube portion 200. Both of the shaft portion 100 and the tube portion 200 are provided with magnets, as described in detail below.

The shaft portion 100, as shown, includes a cone portion 110 and a shaft 120. The shaft 120 can be connected to a top extent of the cone portion 110, in the orientation as shown in FIG. 5. The shaft portion 120 can also include an overstroke head 150.

The tube portion 200, as shown, includes a frustoconical or frustum portion 210 and a cylinder or sleeve 220. A lower extent of the cylinder 220 is connected to an upper extent of the frustum portion 210. As shown, the tube portion 200 can also include an overstroke sleeve 251 and an overstroke housing 250. The overstroke housing 250 (of the tube portion 200) is connected to an engine mount 290 or some other component mount or arrangement, such as another powertrain component.

The overstroke sleeve 251 and the overstroke housing 250, at least in part, form a cavity 151. The overstroke head 150 is disposed or provided in the cavity 151. As a result, only limited movement of the overstroke head 150 is allowed in that engagement of the overstroke head 150 to the various walls of the cavity 151 limit movement of the overstroke head 151.

It should be appreciated that the relative dimensions and/or tolerances of the overstroke head 150 relative to the various walls of cavity 151 can be taken into consideration (in manufacturing) relative to the dimensions and/or tolerances of one or more air gaps between the various sets of magnets, as described in detail below. For example, in some embodiments of the disclosure, it can be desirable to limit movement of the shaft portion 100 within the tube portion 200 such that overstroke head 150 engages a cavity wall prior to one or more magnets (of a magnet set) coming into contact with each other. It can be desirable to so control movement of the overstroke head (shaft portion 100) so as to control movement, in some directions and/or orientations, but not other directions and/or orientations.

FIG. 6 is a cross-sectional schematic view showing shaft portion 100 of FIG. 5, in accordance with one or more embodiments of the disclosure. The shaft portion 100 includes the shaft 120 and the cone portion 110, as described above. The shaft 120 can be characterized as a first inner magnet support portion. The cone portion 110 can be characterized as a second inner magnet support portion.

As shown, the shaft 120 can be provided with one or more outwardly facing magnets 121. As described herein, magnets can be provided on a support surface or structure in different manners. For example, the support structure can include a cavity or opening into which the particular magnet is received. In this manner, the magnet can be provided on the support structure. On the other hand, the support structure can indeed be the magnet or be integrally formed with the magnet. In this manner, the magnet can be provided on the support structure. Other arrangements can also be utilized such as a portion of a magnet being integrally formed with the support structure and another portion being fastened onto or into a cavity of the support structure. Various connection techniques and methodologies can be utilized to connect a magnet to a support structure. For example, welding, soldering, mechanical attachments such as bolts or screws, and/or adhesive can be utilized.

As described herein, FIGS. 5-8 are cross-sectional schematic views showing a magnetic engine mount (MEM) system 60. In accordance with some embodiments described herein, the MEM system is in the form of an annular structure such that the various components of the MEM system are in the form of an annular magnet or sequence of magnets arranged in annular manner, a circular shaft, a frustum conical shape, a frustum shaped, a donut shape, and/or other geometrical structure or shape which encircles a centerline such as centerline 62. Such structure or arrangement can be desirable so as to control movement in three dimensions. However, it is appreciated that in other embodiments of the disclosure, the MEM system 60 can indeed be a planar arrangement of components. In such arrangement, the magnets provided on the shaft 120 and the other magnets provided on the various support surfaces would not be annular or toroidal shape, but would rather be linear in shape. In such arrangement, the MEM system would be limited to control movement and/or damping in only two dimensions, i.e. versus three dimensions.

With further reference to FIG. 6, the cone portion 110 serves to connect the frame mount 190 to the shaft 120. Magnets are provided on the cone portion 110. These magnets can be characterized as "damper" magnets in that they provide a push and pull force that effectively damps relative movement between the powertrain mount and the frame mount, for example. The magnets supported on the cone portion 110 can also be characterized as an outwardly facing magnet set 111.

As shown in FIG. 6, the outwardly facing magnet set 111 includes a first outwardly facing damper magnet damper magnet 112 and a second outwardly facing damper magnet 113. In the schematic illustration of FIG. 6, as well as in FIGS. 5 and 7-8, the components of the MEM system are annular or circular in shape. Accordingly, the structure 112 on the right-hand side of FIG. 6 corresponds to the same structure 112 as shown on the left-hand side of FIG. 6. Similarly, the second outwardly facing damper magnet 113, and the other magnets of the MEM system, are annular in shape as shown in FIGS. 5-8.

FIG. 7 is a cross-sectional schematic view showing tube portion 200 of FIG. 5, in accordance with one or more embodiments of the disclosure. The tube portion 200 includes the cylinder 220 and the frustum portion 210, as described above. The tube portion 200 can be integrally formed with or attached to powertrain mount 290.

The tube portion 200 is provided with inwardly facing magnet 221. The inwardly facing magnet 221 is provided on an interior circumferential periphery of the cylinder 220. The cylinder 220 can be characterized as a first outer magnet support portion. The cylinder 220, being in a cylindrical shape, extends along a segment of centerline 62 in a concentric manner and with a constant circumference along such segment, i.e., so as to be in a parallel relationship with the centerline 62.

The tube portion 200 also includes frustum portion 210. The frustum portion 210 can be characterized as a second outer magnet support portion. As shown, the frustum portion 210 is provided at an oblique or angular orientation to the cylinder 220. It is appreciated that the particular angle of the frustum portion 210 relative to the cylinder 220 can depend on the particular application or use of the MEM system 60.

As shown in FIG. 7, an inwardly facing magnet set 211 includes a first inwardly facing damper magnet damper magnet 212 and a second inwardly facing damper magnet 213. In the schematic illustration as portrayed in FIG. 7, the components of the MEM system are annular or circular in shape. Accordingly, the structure 212 on the right-hand side of FIG. 7 corresponds to the same structure 212 as shown on the left hand side of FIG. 7. The structure 213 on the right-hand side of FIG. 7 corresponds to the same structure 213 as shown on the left hand side of FIG. 7.

Referring to FIGS. 5-7, in the radial direction, the relative positions of the tube portion 200 and the shaft portion 100 can be controlled by the outwardly facing magnet 121 and the inwardly facing magnet 221. The poles of the opposing outwardly facing magnet 121 and the inwardly facing magnet 221 can be oriented such that the magnets 121, 221 repel each other. The repulsive force supports the shaft portion 100 within the tube portion 200 such that the shaft portion 100 is spaced away from the tube portion by an air gap. Further, the poles of the first outwardly facing DM 112 and the poles of the first inwardly facing damper magnet 212 can be oriented such that the first damper magnet magnets 112, 212 attract each other. Further still, the poles of the second outwardly facing damper magnet 113 and the poles of the second inwardly facing damper magnet 213 can be oriented such that the second damper magnet magnets 113, 213 attract each other.

FIG. 8 is a cross-sectional schematic view showing an overstroke or stopper assembly 300, of the tube portion 200, of FIG. 5, in accordance with one or more embodiments of the disclosure. The overstroke assembly 300 can absorb energy or a portion of an input load in the event of an excessive input loading that causes relative displacement of the shaft portion 100 the tube portion 200 by a distance that approaches but is less than the smallest of the air gap between the magnets 121, 221, the air gap between the magnets 112, 212, and the air gap between the magnets 113, 213. The overstroke assembly 300 can prevent overloading in both an axial direction and a radial (or lateral) direction of the MEM system 60.

The overstroke assembly 300 includes overstroke head 150 and overstroke housing 250. Additionally, the overstroke assembly 300 includes overstroke sleeve 251. The overstroke housing 250 includes or is provided with an overstroke end stop 252. The overstroke end stop 252, overstroke sleeve 251, and cylinder 220 serve to restrain, control, or limit motion of the overstroke head 150, in operation of the MEM system 60. Accordingly, for example, the overstroke head 150 can contact the overstroke end stop 252 before the inwardly facing magnet set 211 contacts the outwardly facing magnet set 111. As a result, damage to the magnet sets can be avoided or limited and/or undesirable "hard" stops of the MEM system 60 can be avoided. Further, one or more component of the overstroke assembly 300 can be formed from an elastic material and/or can be formed in structural arrangement that responds elastically to an energy or load input to the overstroke assembly 300. For example, the overstroke head 150 can include an outer layer of elastic material such as but not limited to rubber, the overstroke sleeve 251 can be formed from an elastic material such as but not limited to rubber, and the overstroke end stop can be formed from an elastic material such as but not limited to rubber. Thus, the overstroke assembly can absorb some or all of the energy or load input.

Figure 9:
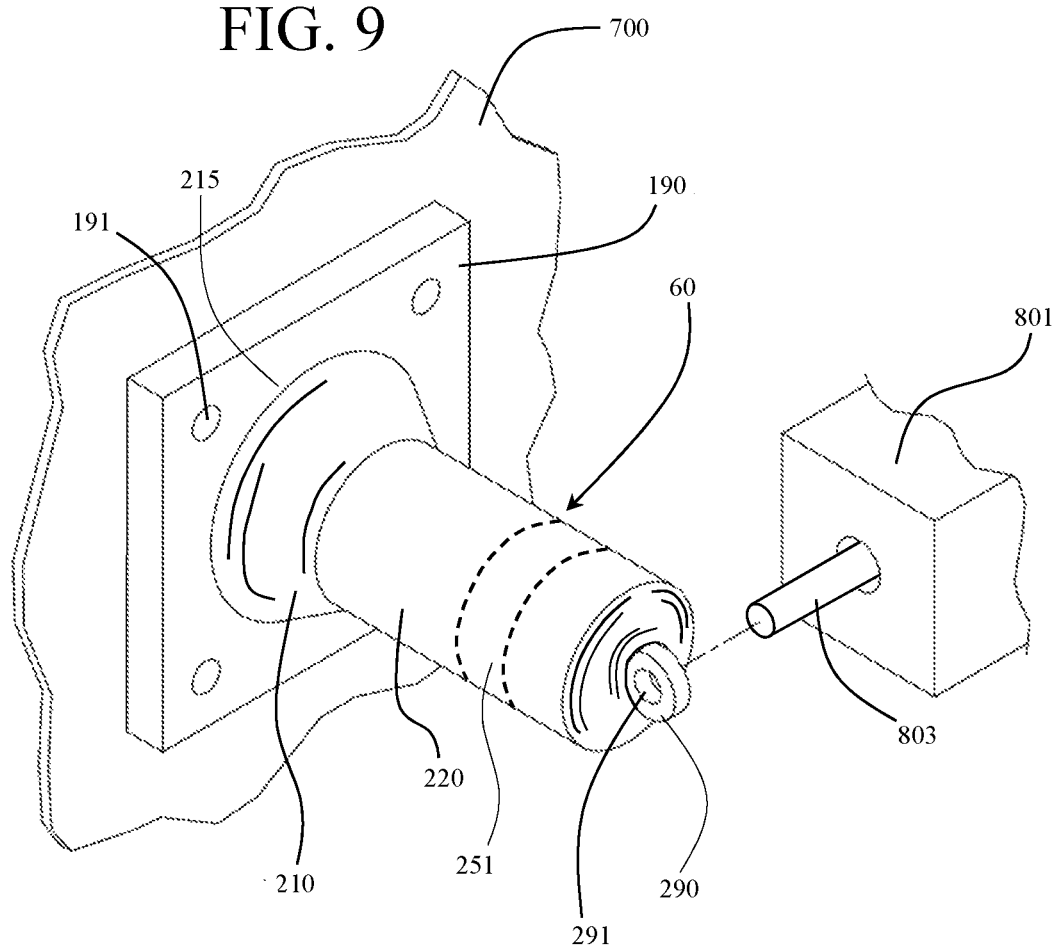
FIG. 9 is a perspective view showing a MEM system the same as or similar to the MEM system shown in FIG. 5, in accordance with one or more embodiments of the disclosure.

FIG. 9 is a perspective view showing a MEM system 60 the same as or similar to the MEM system shown in FIG. 5, in accordance with one or more embodiments. As shown, the MEM system 60 includes a frame mount 190 that is mounted on a portion of frame 700 or any appropriately rigid portion of the vehicle 10. The MEM system 60 includes a frustum portion 210 and a cylinder 220. The structure of the frustum portion 210 and the cylinder 220 can be of similar structure to that shown in FIG. 5, for example.

The frustum portion 210 can include lower edge 215, as is also shown in FIG. 5. The MEM system 60, as shown in FIG. 9, can be connected to frame mount 190 in similar manner to that shown in FIG. 5. In turn, the frame mount 190 can be connected to frame 700 utilizing suitable fasteners 191.

The MEM system 60 can include powertrain or engine mount 290. Any of a variety of connection arrangements and mechanisms can be utilized to connect the MEM system 60 to the engine or other powertrain component. As depicted in FIG. 9, the powertrain mount 290 includes an eyelet 219. Such eyelet can be arranged to receive a mechanical fastener 803 such as but not limited to a bolt extending from an engine mounting flange into the power train mount 290. For example, the engine mounting structure 801 can be integrally formed with an engine block, such as in a casting process. The mechanical fastener 803 can be inserted into and through the eyelet 219 and secured utilizing a mating mechanical fastener such as but not limited to a nut.

Additionally, FIG. 9 shows overstroke sleeve 251 in dashed line. It is appreciated that the overstroke sleeve 251 may or may not be physically distinguishable from the exterior of the MEM system 60. In at least some embodiments of the disclosure, the overstroke sleeve 251 both constrains movement of the overstroke head 150, as well as movably or flexibly connects, to some extent, the cylinder 220 with the overstroke housing 250.

Figure 10:
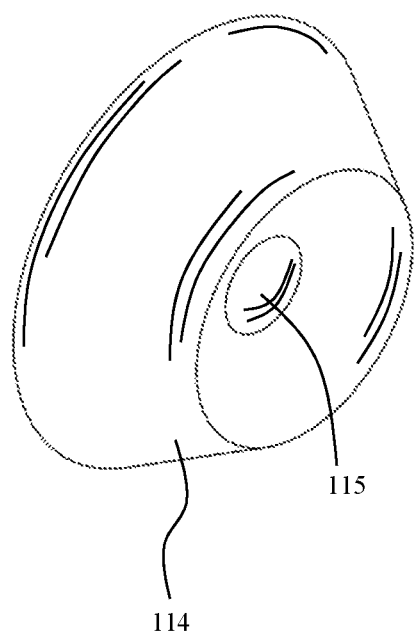
FIG. 10 is a perspective view of a frustum magnet, in accordance with one or more embodiments of the disclosure.

FIG. 10 is a perspective view of a frustum magnet 114, in accordance with one or more embodiments of the disclosure. The frustum magnet 114 shows the frustum and/or frusto-conical structure of the magnets in the outwardly facing magnet set 111 and/or in the inwardly facing magnet set 211. In other words, the first inwardly facing damper magnet (DM) 212, the second inwardly facing damper magnet 213, the first outwardly facing damper magnet 112, and/or the second outwardly facing damper magnet 113 can each be of the general structure of the frustum magnet 114 shown in FIG. 10, in accordance with one or more embodiments of the disclosure. The frustum magnet 114 can include bore 115. Such bore 115 can be varied in size as desired, i.e. in particular to allot for if the magnet is an inwardly facing magnet provided on frustum portion 210 or if the magnet is an outwardly facing magnet provided on the cone portion 110.

Figure 11:
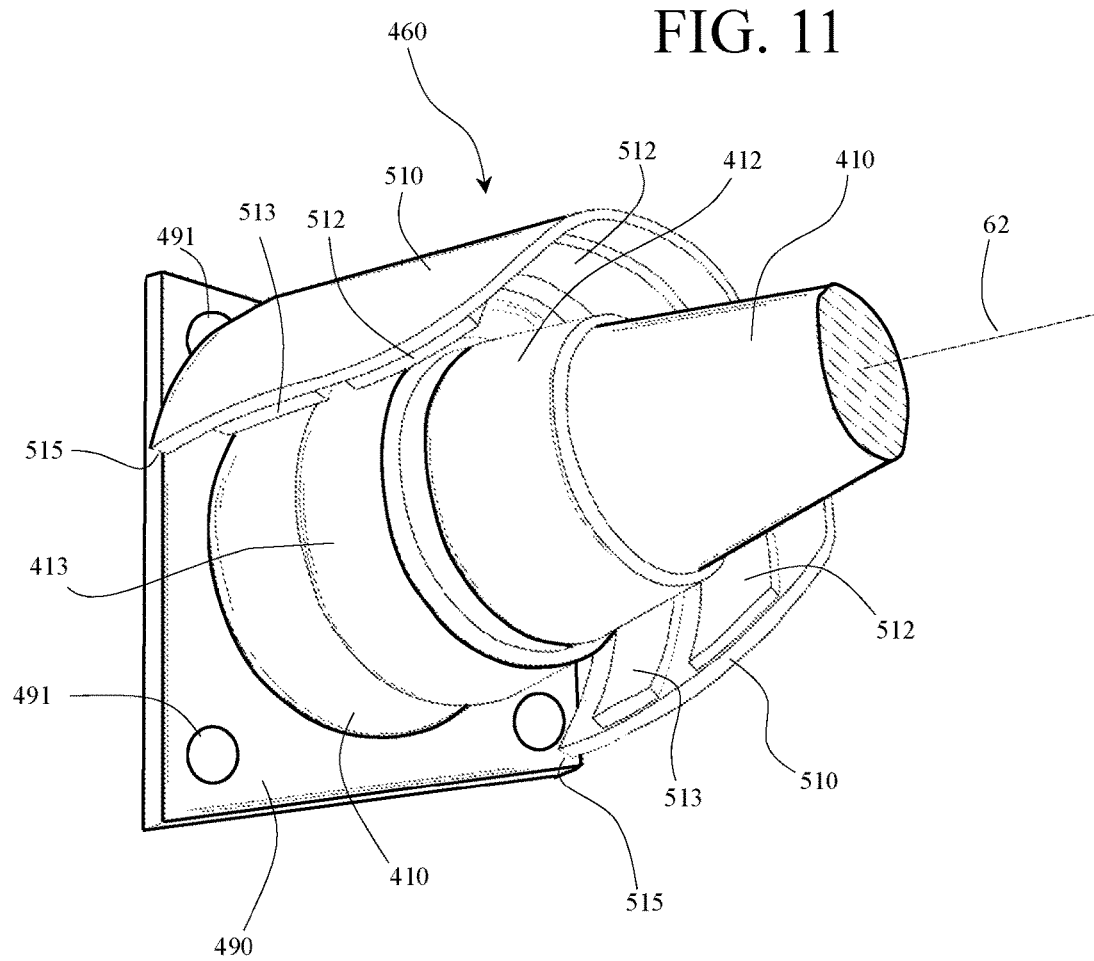
FIG. 11 is a perspective view showing a MEM system similar to the MEM system shown in FIG. 5, in accordance with one or more embodiments of the disclosure.

FIG. 11 is a perspective cut-away-view showing a MEM system 460 similar to the MEM system shown in FIG. 5, in accordance with one or more embodiments of the disclosure. As illustrated in FIG. 11, the dimensions and spacing have been exaggerated for purposes of illustration relative to the structure shown in FIG. 5.

In a manner similar to the structure of FIG. 5, the MEM system 460 includes a cone portion 410 that is connected to a frame mount 490. The frame mount 490 can constitute a "second" component mount. The frame mount 490 can be connected to the frame of the vehicle or other support structure utilizing suitable fasteners as represented by fasteners 491. Provided on the cone portion 410 is a first outwardly facing damper magnet 412 and a second outwardly facing damper magnet 413.

FIG. 11 also shows frustum portion 510. The frustum portion 510 can be of similar structure to the frustum portion 210 shown in FIG. 5. The frustum portion 510 includes first inwardly facing damper magnet 512 and second inwardly facing damper magnet 513. The frustum portion 510 can include a frustum portion lower edge 515 in the same manner as the frustum portion 210, of FIG. 5, includes lower edge 215. Various components of the MEM system 460 including the frustum portion 510, the cone portion 410, and the various damper magnets 512, 513, 412, and 413 can be concentrically provided about center line 62.

As otherwise described herein, the damper magnets 512, 513, 412, and 413 shown in FIG. 11 are each in the form of a single integral piece. However, as otherwise described herein, each of the damper magnets 512, 513, 412, and 413 can be a plurality of magnets aligned in sequence about either the cone portion 410 or the frustum portion 510.

Additionally, the magnets 412, 413 are shown in FIG. 11 as separate structure relative to the frustum portion 510. However, in at least some embodiments of the disclosure, the magnets 412, 413 can be in part or in whole integrally formed with the cone portion 410. Relatedly, it is appreciated that the cone portion 410 may in fact be constructed of distinct or separate pieces that are attached together with each of the separate pieces including magnets 412, 413. Such segregated construction might be utilized to assist in separate magnetization of the distinct pieces, as needed.

Additionally, the magnets 512, 513 are shown in FIG. 11 as separate structure relative to the frustum portion 510. However, in at least some embodiments of the disclosure, the magnets 512, 513 may be in part or in whole integrally formed with the frustum portion 510. Relatedly, it is appreciated that the frustum portion 510 may in fact be constructed of distinct or separate pieces that are attached together with each of the separate pieces including magnets 512, 513. Such segregated construction might be utilized to assist in separate magnetization of the distinct pieces, as needed.

It should further be appreciated that the system of the disclosure is not limited to the particular number of damper magnets 512, 513, 412, and 413 along centerline 62. For example, the MEM system can include two first inwardly facing damper magnets (DM) 512, two second inwardly facing damper magnets 513, two first outwardly facing damper magnets 412, and/or two second outwardly facing damper magnets 413, or any number of such magnet as may be desired. The system 460 can also include any number of outwardly facing magnets 421, i.e., which can be characterized as bearing magnets. In general, for the various magnets described herein, each of such magnets can be made up of a plurality of magnets as can be desired either in the axial direction along centerline 62, transversely, and/or circumferentially, for example.

It is appreciated that the polarity or direction of the magnets described herein are for purposes of illustration. It is of course appreciated that polarities of a pair of magnets or of magnets can be switched as desired. For example, a south pole of damper magnet 113 interacts with a south pole of damper magnet 213 (as shown in FIG. 5) so as to provide a repelling force. The magnet polarities can be constructed so as to be switched, i.e. such that a north pole of damper magnet 113 interacts with a north pole of damper magnet 213 so as to provide a repelling force.

It is appreciated that the various components of embodiments of the disclosure can be made from any of a variety of materials including, for example, metal, plastic, plastic resin, nylon, composite material, and/or rubber, for example, or any other material as may be desired.

A variety of production techniques can be used to make the apparatuses as described herein. For example, suitable casting and/or injection molding and other molding techniques and other manufacturing techniques might be utilized. Also, the various components of the apparatuses can be integrally formed, as can be desired, in particular when using casting or molding construction techniques.

The various apparatuses and components of the apparatuses, as described herein, may be provided in various sizes, shapes, and/or dimensions, as desired.

It will be appreciated that features, elements and/or characteristics described with respect to one embodiment of the disclosure can be variously used with other embodiments of the disclosure as can be desired.

It will be appreciated that the effects of the present disclosure are not limited to the above-mentioned effects, and other effects, which are not mentioned herein, will be apparent to those in the art from the disclosure and accompanying claims.

Although the preferred embodiments of the present disclosure have been disclosed for illustrative purposes, those skilled in the art will appreciate that various modifications, additions and substitutions are possible, without departing from the scope and spirit of the disclosure and accompanying claims.

Embodiments are also intended to include or otherwise cover methods of using and methods of manufacturing any or all of the elements disclosed above. While certain embodiments of the disclosure are described above, it should be understood that the invention can be embodied and configured in many different ways without departing from the spirit and scope of the disclosure.

While the subject matter has been described in detail with reference to exemplary embodiments thereof, it will be apparent to one skilled in the art that various changes can be made, and equivalents employed, without departing from the scope of the disclosure.

What is claimed is:

1. A mount system for mounting a first component of a vehicle to a second component of the vehicle, the mount system comprising:
    a tube portion, including a first component mount, that is provided about a centerline, the tube portion including:
        a first outer magnet support portion oriented about the centerline, and including an inwardly facing magnet that is parallel to the centerline; and
        a second outer magnet support portion oriented about the centerline, and including an inwardly facing magnet set that includes:
            a first inwardly facing damper magnet that is oblique to the centerline, and
            a second inwardly facing damper magnet that is oblique to the centerline; and
    a shaft portion, including a second component mount, that is provided about the centerline, the shaft portion including:
        a first inner magnet support portion, oriented about the centerline, provided with an outwardly facing magnet that is parallel to the centerline; and
        a second inner magnet support portion oriented about the centerline, and including an outwardly facing magnet set that includes:
            a first outwardly facing damper magnet that is oblique to the centerline, and
            a second outwardly facing damper magnet that is oblique to the centerline; and
    the inwardly facing magnet interacts with the outwardly facing magnet to repel, with a first air gap provided therebetween;
    the first inwardly facing damper magnet interacts with the first outwardly facing damper magnet to attract, with a second air gap provided therebetween; and
    the second inwardly facing damper magnet interacts with the second outwardly facing damper magnet to repel, with a third air gap provided therebetween.

2. The mount system of claim 1, wherein the second air gap is positioned between the first air gap and the third air gap.

3. The mount system of claim 1, wherein the first outer magnet support portion includes a cylinder extending along a segment of the centerline in a concentric manner.

4. The mount system of claim 3, wherein the second outer magnet support portion includes a frustum portion in the shape of a frustum extending along a segment of the centerline in a concentric manner, and the cylinder is connected to an end of the frustum portion.

5. The mount system of claim 4, wherein the inwardly facing magnet is constituted by a series of magnets extending about an inner periphery of the first outer magnet support portion.

6. The mount system of claim 4, wherein the inwardly facing magnet is constituted by a single annular magnet extending about an inner periphery of the first outer magnet support portion.

7. The mount system of claim 4, wherein the first inwardly facing damper magnet is constituted by a single annular magnet extending about an inner periphery of the second outer magnet support portion; and
the second inwardly facing damper magnet is constituted by a further single annular magnet that extends about an inner periphery of the second outer magnet support portion.

8. The mount system of claim 1, wherein the first inner magnet support portion is a shaft that extends along a segment of the centerline in a concentric manner about the centerline.

9. The mount system of claim 8, wherein the second inner magnet support portion is a cone portion extending along a segment of the centerline in a concentric manner about the centerline, and the shaft is connected to an end of the cone portion; and
the outwardly facing magnet is constituted by a series of magnets that extend about an outer periphery of the first outer magnet support portion.

10. The mount system of claim 8, wherein the outwardly facing magnet is constituted by a single annular magnet extending about an outer periphery of the shaft.

11. The mount system of claim 8, wherein the first outwardly facing DM is constituted by a single annular magnet extending about an outer periphery of the second inner magnet support portion; and
the second outwardly facing damper magnet is constituted by a further single annular magnet that extends about an outer periphery of the second inner magnet support portion.

12. The mount system of claim 1, wherein:
the first component mount is a powertrain mount for mounting to a powertrain component of the vehicle, such that the powertrain component constitutes the first component; and
the second component mount is a frame mount for mounting to a frame of the vehicle, such that the frame constitutes the second component.

13. The mount system of claim 1, wherein:
the second component mount is a powertrain mount for mounting to a powertrain component of the vehicle, such that the powertrain component constitutes the second component; and
the first component mount is a frame mount for mounting to a frame of the vehicle, such that the frame constitutes the first component.

14. The mount system of claim 1, wherein the tube portion includes an overstroke assembly, the overstroke assembly including:

an overstroke end stop provided in the tube portion;
an overstroke sleeve provided in the tube portion, and the overstroke end stop and the overstroke sleeve defining a cavity; and
an overstroke head that is connected to the shaft portion, with the overstroke head disposed in the cavity so as to limit movement of the tube portion with respect to the shaft portion.

15. The mount system of claim 14, wherein the overstroke end stop, the overstroke sleeve and the overstroke head are each constructed at least in part of a rubber material.

16. The mount system of claim 1, wherein the inwardly facing magnet is constituted by a plurality of separate magnets arranged circumferentially around an inner periphery of the tube portion, and
the outwardly facing magnet is constituted by a plurality of separate magnets arranged circumferentially around an outer periphery of the shaft portion.

17. A vehicle with mount system comprising:
a powertrain component;
a vehicle frame; and
a mount system connecting the powertrain component to the frame at respective locations on the powertrain component, and the mount system including:
a tube portion, including a first component mount, that is provided about a centerline, the tube portion including:
a first outer magnet support portion oriented about the centerline, and including an inwardly facing magnet that is parallel to the centerline; and
a second outer magnet support portion oriented about the centerline, and including an inwardly facing magnet set that includes:
a first inwardly facing damper magnet that is oblique to the centerline, and
a second inwardly facing damper magnet that is oblique to the centerline; and
a shaft portion, including a second component mount, that is provided about the centerline, the shaft portion including:
a first inner magnet support portion oriented about the centerline, and including an outwardly facing magnet that is parallel to the centerline; and
a second inner magnet support portion oriented about the centerline, and including an outwardly facing magnet set that includes:
a first outwardly facing damper magnet that is oblique to the centerline, and
a second outwardly facing damper magnet that is oblique to the centerline; and
the inwardly facing magnet interacts with the outwardly facing magnet to repel, with a first air gap provided therebetween;
the first inwardly facing damper magnet interacts with the first outwardly facing damper magnet to attract, with a second air gap provided therebetween; and
the second inwardly facing damper magnet interacts with the second outwardly facing damper magnet to repel, with a third air gap provided therebetween.

18. The vehicle of claim 17, wherein the powertrain component is an engine.

19. The vehicle of claim 17, wherein:
the first component mount is attached to the engine, and
the second component mount is attached to the frame.

20. A mount system for mounting a first component of a vehicle to a second component of the vehicle, the mount system comprising:

a tube portion, including a first component mount, that is provided about a centerline, the tube portion including:
  a first outer magnet support portion oriented about the centerline, and including an inwardly facing magnet that is parallel to the centerline; and
  a second outer magnet support portion oriented about the centerline, and including an inwardly facing magnet set that includes:
    a first inwardly facing damper magnet that is oblique to the centerline, and
    a second inwardly facing damper magnet that is oblique to the centerline;
a shaft portion, including a second component mount, that is provided about the centerline, the shaft portion including:
  a first inner magnet support portion oriented about the centerline, and including an outwardly facing magnet that is parallel to the centerline; and
  a second inner magnet support portion oriented about the centerline, and including an outwardly facing magnet set that includes:
    a first outwardly facing damper magnet that is oblique to the centerline, and
    a second outwardly facing damper magnet that is oblique to the centerline; and the inwardly facing magnet interacts with the outwardly facing magnet to repel, with a first air gap provided therebetween;
the first inwardly facing damper magnet interacts with the first outwardly facing damper magnet to attract, with a second air gap provided therebetween; and
the second inwardly facing damper magnet interacts with the second outwardly facing damper magnet to repel, with a third air gap provided therebetween; and
wherein the tube portion includes an overstroke assembly, the overstroke assembly including:
a first energy absorbing member mounted on the tube portion; and
a second energy absorbing member mounted on the shaft portion such that the first and second energy absorbing members are spaced apart from each other when each of the first air gap, the second air gap, and the third air gap are maintained, and the first and second energy absorbing members contact each other when one of the tube portion and the shaft portion moves relative to another one of the tube portion and the shaft portion by a distance less than any one of the first air gap, the second air gap, and the third air gap.

* * * * *